Patented Oct. 5, 1937

2,095,211

UNITED STATES PATENT OFFICE 2,095,211

MOTOR FUEL

Leo P. Chebotar, Bayonne, N. J., assignor to The Texas Company, New York, N. Y., a corporation of Delaware No Drawing. Application November 6, 1930, Serial No. 493,916

12 Claims. (Cl. 44—9)

This invention relates to fuels and more particularly to motor fuels such as gasoline and other volatile hydrocarbons suitable for use in internal combustion engines.

The invention is concerned with the provision of a fuel ingredient having antioxidant, gum inhibitor and antiknock stabilizing qualities, the same comprising a dye or coloring agent. It has to do with the provision of an improved coloring material which will be particularly suitable in coloring gasoline, which will prevent autoxidation and stabilize the fuel against formation of gum and loss of antiknock quality.

It is well known in the art that gasolines, especially cracked gasolines, are somewhat unstable when exposed to light and air. Thus, on exposure, the color of these products often darkens, a gummy or resinous material deposits, and a substantial increase in the detonation quality of the oil occurs. The unstable character of petroleum motor fuels is attributed to certain reactive constituents, usually highly unsaturated compounds, which often contribute to the antiknock value of a cracked gasoline. It is highly desirable, therefore, that motor fuels be resistant to influences that cause the conversion of valuable materials into undesirable products, especially since it is often necessary to store the products for considerable periods of time.

I have discovered that the addition of certain ingredients to the motor fuel, especially gasoline, greatly stabilizes it toward oxidation and alleviates the evils due to spontaneous oxidation when the product is exposed to air or light. Furthermore, the ingredients that are useful according to the invention are dyes which impart a brilliant color to the gasoline, an effect that is an advantage when it is desirable to impart a distinctive appearance to an improved product. The ingredients which are the feature of the invention, therefore, accomplish a two-fold function, as an antioxidant and a coloring agent, which enhances the advantage of the present invention.

The dyes which have been found most suitable and effective consist of compounds derived from the combination of aromatic compounds containing at least one phenol and one amino radical. Most of these compounds, particularly those desirable for purposes of the invention, exhibit phenolic properties and are strong antioxidants. The indophenol dyes come within the scope of the invention and are particularly effective. Indophenol has been found especially desirable. Naphthol Blue may be mentioned also as coming within this series of dyes.

The invention contemplates the use of any dye which acts as an antioxidant when dissolved in gasoline. Dyes which have been found to be particularly effective are those derived from the combination of compounds containing the hydroxyl and amino group. By combination is meant the bringing together of molecules containing the hydroxyl and amino group by oxidation, condensation or reactions between derivatives of these compounds such as the halogen substitution products. Compounds containing the hydroxyl group comprise such compounds as phenol, cresols, naphthol and their derivatives. Compounds containing the amino group are preferably the aromatic amines and their derivatives. The aromatic amines may comprise diamines and the aryl substituted derivatives. Amino-phenols also are useful and are intended to be included within the compounds containing the amino group. From the foregoing, it will be noted that phenol or naphthol or their derivatives and homologs may be combined with an amine, an aryl substituted amine, an aromatic diamine, an aminophenol and their derivatives to produce a dye having antioxidant properties suitable for use in the invention.

The chemistry of the production of dyes of the indophenol structure of general formula which comes within the scope of the invention is well known in the art of dyestuffs and need not be discussed at length. The simplest illustration of the reaction forming these dyes is (1) the oxidation of p-amido-phenol and phenol or (2) p-phenylene diamine and phenol. While both of the classes illustrated above are commonly known as indophenols, they may be more specifically designated as indophenols of class 1 and indophenols of class 2, the latter sometimes termed "indoanilines". Instead of phenol, γ-naphthol may be used successfully in the reaction. Other examples will obviously occur to those skilled in the art of dyestuffs and I have intended to include these in the scope of the invention.

The dyes which are useful in practicing the invention will vary in properties. The solubility of various dyes in oil differs widely and it is important that the product be somewhat soluble in gasoline. The color of the dye will vary according to the original materials selected. Those derived from phenol are often red while those derived from naphthol are usually blue when dissolved in gasoline. It will be understood that variation in shades is possible by proper selection of basic materials. Indophenol has been found to impart a brilliant red to gasoline and to increase the resistance of gasoline to oxidation to a remarkable degree. A suitable color and desired antioxidation property to suit the requirements which may arise in practice is possible by proper selection of materials described within the scope of the invention.

The quantity of dye required to practice the invention is usually very small. While the increase in resistance to oxidation may often be proportional to the quantity of antioxidant, the use of large quantities is prohibited due to the coloring effect of the dye. Market conditions will demand that a uniform color consistent with an attractive appearance be maintained. A quantity of dye necessary to impart a desired color has been found to be sufficient in most cases to produce the required antioxidizing property. Quantities as low as 0.01 percent have been found sufficient to increase the resistance of gasoline to oxidation over 100 percent. While it is impossible to set a definite quantity of the antioxidant suitable for all dyes that may be used according to the invention, it may be stated that an amount not in excess of 1 percent by weight and preferably from 0.002 percent to 0.5 percent is thought to give maximum results. It is preferable that a dye be selected which increases the resistance to oxidation in excess of 50 percent when using these quantities.

The motor fuel to be treated according to the invention may comprise commercial gasoline, preferably cracked gasoline, or other liquid hydrocarbon fuels such as blends of gasoline with other hydrocarbons, particularly coal tar hydrocarbons, like benzol. Gasolines containing various anti-knock reagents may conveniently be treated according to the invention. The invention is especially applicable to highly unsaturated fuels, such as products derived from vapor phase cracking which are very susceptible to autoxidation.

Obviously many modifications and variations of the invention, as hereinbefore set forth, may be made without departing from the spirit and scope thereof, and therefore only such limitations should be imposed as are indicated in the appended claims.

I claim:

1. A cracked gasoline normally tending to deteriorate and form gums on storage and containing an indophenol dye in quantity sufficient to substantially inhibit such gum formation.

2. The method of treating cracked gasoline to retard gum formation therein which comprises adding to the gasoline an indophenol.

3. A motor fuel comprising cracked gasoline and a compound containing the indophenol structure.

4. A motor fuel comprising cracked gasoline and a small amount of an indoaniline.

5. A motor fuel comprising cracked gasoline and a small amount of a phenol indophenol.

6. A motor fuel comprising cracked gasoline and a small amount of a naphthol indophenol.

7. The method of treating cracked gasolines and the like to inhibit reactions of the nature of gum formation which comprises incorporating in the gasoline a small amount of an indoaniline.

8. The method of treating cracked gasolines and the like to inhibit reactions of the nature of gum formation which comprises incorporating in the gasoline a small amount of a phenol indophenol.

9. The method of treating cracked gasolines and the like to inhibit reactions of the nature of gum formation which comprises incorporating in the gasoline a small amount of a naphthol indophenol.

10. The method of treating cracked gasoline to retard gum formation therein which comprises adding to the gasoline a compound selected from the group consisting of indophenol and alpha-naphthol blue.

11. A motor fuel comprising cracked gasoline to which has been added a small quantity of naphthol blue.

12. A motor fuel comprising cracked gasoline and indophenol.

LEO P. CHEBOTAR.